(12) United States Patent
Alghazali (10) Patent No.: US 11,448,046 B2
(45) Date of Patent: Sep. 20, 2022

(54) SMART COMPLETION MAXIMUM RESERVOIR CONTACT (MRC) WELL OPTIMIZATION MODEL

(71) Applicant: Saudi Arabian Oil Company, Dhahran (SA)

(72) Inventor: Mohieddin Attig Ali Alghazali, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 531 days.

(21) Appl. No.: 16/596,171

(22) Filed: Oct. 8, 2019

(65) Prior Publication Data
US 2021/0102446 A1 Apr. 8, 2021

(51) Int. Cl.
| | |
|---|---|
| G06F 3/04842 | (2022.01) |
| E21B 43/12 | (2006.01) |
| E21B 34/08 | (2006.01) |
| E21B 41/00 | (2006.01) |
| E21B 43/14 | (2006.01) |
| G01V 1/30 | (2006.01) |

(52) U.S. Cl.
CPC .......... *E21B 43/12* (2013.01); *E21B 34/08* (2013.01); *E21B 41/0042* (2013.01); *E21B 43/14* (2013.01); *G01V 1/308* (2013.01); *G06F 3/04842* (2013.01); *E21B 2200/20* (2020.05)

(58) Field of Classification Search
CPC ...... E21B 43/12; E21B 34/08; E21B 41/0042; E21B 43/14; E21B 2200/20; E21B 43/00; G01V 1/308; G06F 3/04842

USPC .................................. 703/10, 2, 1
See application file for complete search history.

(56) References Cited

U.S. PATENT DOCUMENTS

| | | | |
|---|---|---|---|
| 5,941,308 A | 8/1999 | Malone et al. | |
| 9,864,353 B2 * | 1/2018 | Tonkin | G05B 15/02 |
| 10,508,521 B2 * | 12/2019 | Shammari | E21B 44/005 |
| 11,326,423 B2 * | 5/2022 | Alanazi | E21B 47/10 |

(Continued)

OTHER PUBLICATIONS

Balouch et al., "A Methodology to Optimize the Horizontal Well Production using Inflow Control Devices: A Case Study", 2018, pp. 33-39.*

(Continued)

*Primary Examiner* — Juan C Ochoa
(74) *Attorney, Agent, or Firm* — Fish & Richardson P.C.

(57) ABSTRACT

Systems and methods include a method for optimizing maximum reservoir contact wells. For each lateral of a multi-lateral well and using input data for the lateral, a lateral flowrate is determined for each opening position for different combinations of internal control valve (ICV) sizes and target flowing bottomhole pressures. Using a numerical model, an estimated total flowrate is determined for each lateral based on the lateral's flowrate. Options are provided for presentation to a user in a user interface for changing ICV settings of the multi-lateral well. Each option includes a predicted added value to production of the multi-lateral well. The predicted added value includes one or more of an individual lateral production contribution, an enhanced sweep efficiency for one or more laterals, or a water rate reduction. A selection by the user of an option is received. The option is implemented during production of the multi-lateral well.

20 Claims, 4 Drawing Sheets

(56) References Cited

U.S. PATENT DOCUMENTS

2018/0347326 A1    12/2018    Shammari et al.

OTHER PUBLICATIONS

Al-Muailu et al., "Evaluating flow contributions and enhancing the design of smart well completions," SPE 164342, presented at the SPE Middle East Oil and Gas Show and Exhibition, Manama, Bahrain, Mar. 10-13, 2013, 10 pages.

PCT International Search Report and Written Opinion in International Appln. No. PCT/US2020/054774, dated Dec. 15, 2020, 15 pages.

Zarea, "A Comprehensive Evaluation of Reservoir Inflow and Wellbore Behavior in Intelligent Wells," a thesis submitted to the Office of Graduate Studies of Texas A&M University in partial fulfillment of the requirements for the degree of Master of Science, Aug. 2010, 63 pages.

\* cited by examiner

SMART COMPLETION MAXIMUM RESERVOIR CONTACT (MRC) WELL OPTIMIZATION MODEL

BACKGROUND

The present disclosure applies to optimization of maximum reservoir contact (MRC) wells. For example, MRC wells can attain more than five kilometers (km) of contact with the reservoir by using side laterals of a main wellbore that can be partially or fully opened and closed from the surface. MRC wells (or multi-lateral wells) can be equipped with permanent downhole monitoring system (PDHMS) gauges and interval control valves (ICVs) (for example, one ICV for each of four to five laterals). The PDHMS and the ICVs can manage water/gas movement and facilitate lateral clean-up.

SUMMARY

The present disclosure describes techniques that can be used for maximum reservoir contact (MRC) well optimization. For example, an MRC well optimization model can be used to provide tools used by production and reservoir engineers to optimize MRC (multi-lateral) wells equipped with interval control valves (ICVs) and a permanent downhole monitoring system (PDHMS). For example, optimizing can refer to achieving production values or productivity indicators of a multi-lateral well which indicate a performance above a predefined threshold. The MRC well optimization model can be implemented (for example, designed and coded) to process certain data inputs and provide engineers with different options for ICVs settings. The settings can be suggested, for example, based on required added value related to individual lateral production contributions, enhanced sweep efficiency for each lateral, or a water rate reductions during comingled laterals production.

In some implementations, a computer-implemented method includes the following. For each lateral of a multi-lateral well and using input data for the lateral, a lateral flowrate is determined for each opening position for different combinations of internal control valve (ICV) sizes and target flowing bottomhole pressures. Using a numerical model, an estimated total flowrate is determined for each lateral of the multi-lateral well based on the lateral flowrate for the lateral. A set of options is provided for presentation to a user in a user interface (UI) for changing one or more ICV settings of the multi-lateral well to particular values. Each option includes a predicted added value to production of the multi-lateral well. The predicted added value includes one or more of an individual lateral production contribution, an enhanced sweep efficiency for one or more laterals, or a water rate reduction. A selection by the user of an option selected from the set of options is received using the UI. The option is implemented during production of the multi-lateral well.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, the techniques described in the present disclosure can speed up the optimization process of MRC wells which can reduce operating costs. Second, a numerical model can be used instead of solely depending on invoice operation, thus reducing costs and potential operational risks. Third, the numerical model can be utilized to optimize MRC wells equipped with smart completion.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for optimizing maximum reservoir contact (MRC) wells. For example, the techniques can include the use of an MRC well optimization model providing tools used by production and reservoir engineers to optimize MRC (or multi-lateral) wells. Optimizing can refer, for example, to achieving production values or productivity indicators of a multi-lateral well which indicate a performance above a predefined threshold. The MRC wells can be equipped with interval control valves (ICVs) and a permanent downhole monitoring system (PDHMS), for example, for monitoring gauges. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

In some implementations, an analytical iterative model can use multilateral wells equipped with smart completion data and reservoir input to estimate the flowrate and bottomhole pressure at different interval control valve opening settings. The results can be further evaluated to select scenarios that are optimized for production and enhancing oil recovery in such wells.

Figure 1:
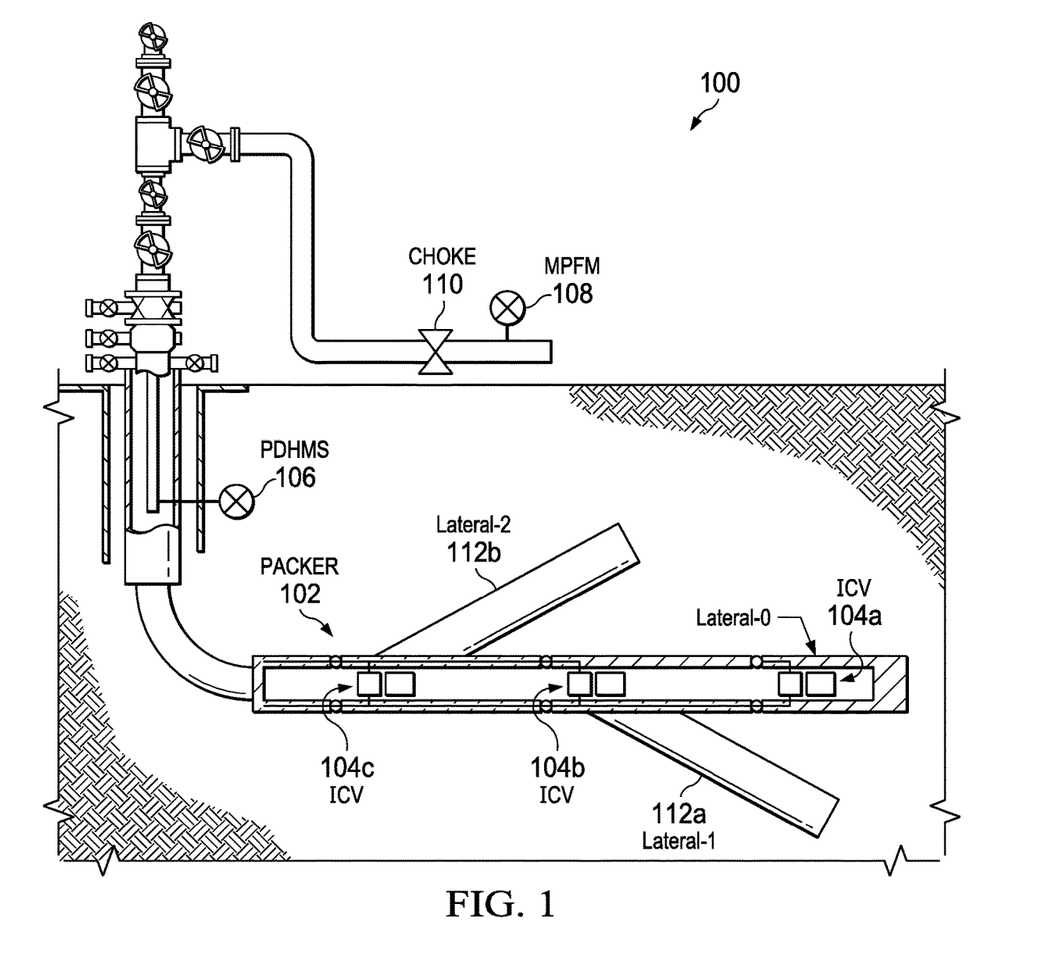
FIG. 1 is a diagram showing an example of a schematic including typical components of a smart well completion (SWC), according to some implementations of the present disclosure.

FIG. 1 is a diagram showing an example of a schematic including typical components of a smart well completion (SWC) 100, according to some implementations of the present disclosure. A typical SWC includes at least one feed-through isolation packer 102, ICVs 104a, 104b, and 104c, and a PDHMS 106. Components of the SWC 100 are usually complemented by a multiphase flow meter (MPFM) gauge 108 and a choke 110 at the surface for flowrate monitoring. The SWC 100 can be typical of MRC wells, for example. The SWC 100 includes laterals 112a and 112b, as depicted, but additional laterals can exist.

In some implementations, a numerical model can be used to optimize MRC wells. The numerical model can be based on IPR curves of each lateral individually and a pressure drop across the lateral ICV at different opening intervals (for example, from 1 to 10 steps). Iterations can be used to estimate the lateral flowrate at a defined bottomhole pressure. The iterations work in several loops to solve for unknown parameters, for example, using Equations 1, 2, and 3. The iterative analytical model can be built using a multi-paradigm, numerical computing environment programming language, such as Matlab. At the same time, converted flow coefficient ($C_v$) values of the lateral ICV can also be used, which can be calculated from field data for different water cut values (for example, obtained from field tests). The numerical model can be calibrated, for example, from one or more MRC wells.

The prior art analytical model is different from conventional techniques because the analytical model is based on calculating the flowrate through the ICV at different opening positions and using a percentage of flowrate from the full-open position of the ICV. This approach can simplify techniques by utilizing linear correlation between flowrate and ICV opening settings.

The techniques of the present disclosure can provide estimated rates based on calculated C factor for each opening position for a different ICV size and watercut. An iterative approach can be used to calculate the lateral flowrate at different ICV opening and desired flowing bottomhole pressures.

Conventional techniques do not use analytical models to estimate flowrate for each lateral individually. Instead, conventional techniques typically provide options by which a multi-lateral well can be produced to surface without comingling the flow downhole. Techniques of the present disclosure use an iterative approach to estimate for the lateral individual flow using actual $C_v$ value based on actual fluid type rather than water based $C_v$ values typically provided by ICV manufacturers.

Analytical models can be based on inflow performance relationship curves of each lateral analyzed individually and pressure drop across the lateral interval control valve at different opening intervals from one to ten steps. An iterative approach can be utilized to estimate the lateral flowrate at proposed bottomhole pressure utilizing Equation (1). Interval control valve flow coefficient $C_v$ can be calculated for different water cut figures and opening sizes from actual field data using Equation (2). The $C_v$ figures then can be utilized as part of the model to estimate the pressure drop across the lateral interval control valve. Several case studies were conducted to calibrate the model using field data from candidates located in an oil field. Further calibration can be conducted using wide field data range which can be collected from other oil fields.

Equations (1), (2), and (3) provide examples of ICV upstream pressure, an ICV pressure drop, an interval control valve upstream pressure, and an ICV downstream pressure.

$$P_{WF} = P_R - Q_L/PI \qquad (1)$$

$$\Delta P = \gamma_L (Q_L/C_v)^2 \qquad (2)$$

$$P_{WB} = P_{WF} - \Delta P \qquad (3)$$

where:

$\Delta P$ is the interval control valve pressure drop (for example, in pounds per square inch gauge (psig));

$P_{WF}$ is the interval control valve upstream pressure (for example, in psig);

$P_R$ is the reservoir pressure $P_{WB}$ is the interval control valve downstream pressure (for example, in psig);

PI is the productivity index (for example, in barrels per day (bpd)/psig);

$Q_L$ is the gross flowrate (for example, in bpd);

$\gamma_L$ is the liquid specific gravity; and $C_v$ is the interval control valve flow coefficient.

Figure 2:
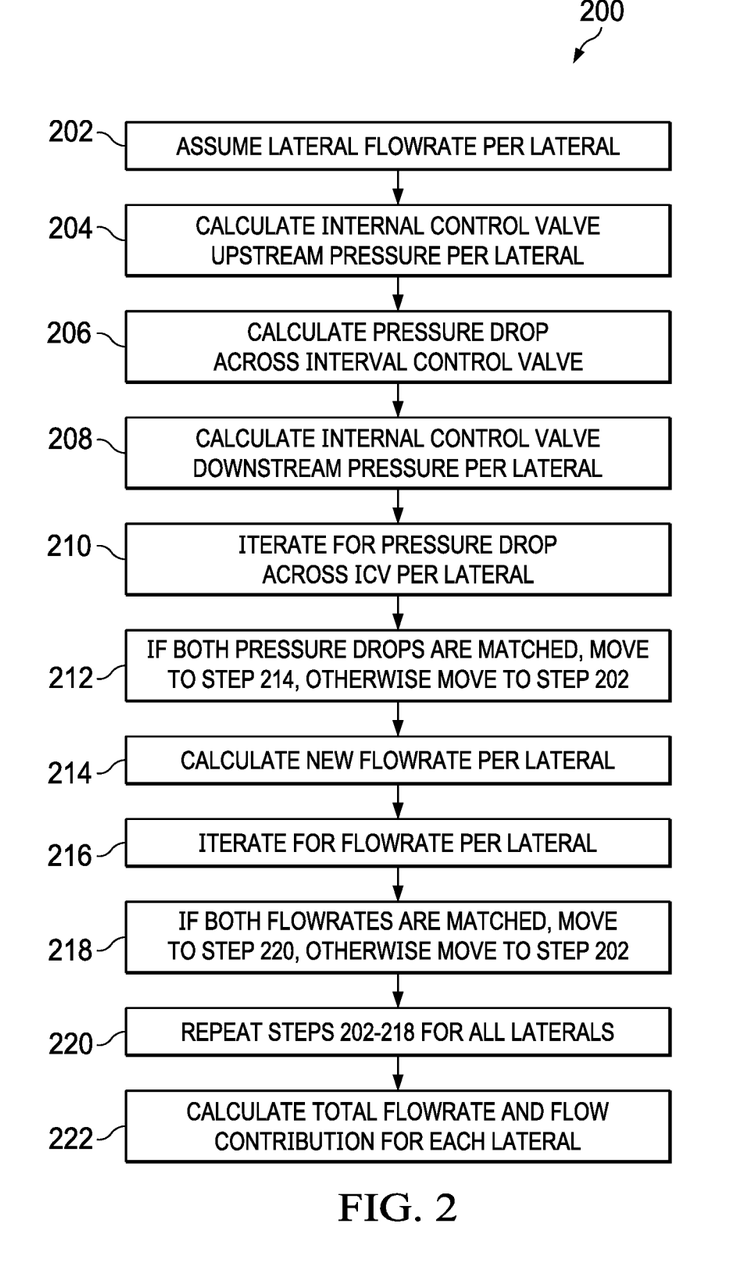
FIG. 2 is a flow diagram of an example of a process for using a numerical model to calculate flowrates, according to some implementations of the present disclosure.

In some implementations, input data to the numerical model can include: 1) a productivity index per lateral, 2) a reservoir pressure per lateral, 3) an interval control valve size, setting and flow area, 4) a calibrated field interval control valve C based on changes on water cut, 5) pressure volume temperature (PVT) data, 6) water cut per lateral, and 7) proposed flowing bottomhole pressure FIG. 2 is a flow diagram of an example of a process 200 for using a numerical model to calculate flowrates, according to some implementations of the present disclosure. For example, the process 200 can be used on the SWC 100 described with reference to FIG. 1.

At 202, a lateral flowrate is assumed for each lateral based on a proposed target flowrate from each lateral or the whole well. For example, the process 200 can begin by first assuming a flowrate for the lateral 112a.

At 204, an interval control valve upstream pressure is calculated for each lateral. As an example, Equation (1) can be used to calculate the interval control valve upstream pressure for the ICV 104a.

At 206, a pressure drop across the interval control valve is calculated. For example, Equation (2) can be used to calculate the pressure drop across the ICV 104a.

At 208, an ICV downstream pressure is calculated for each lateral. For example, Equation (3) can be used to calculate the interval control valve downstream pressure for the ICV 104a.

At 210, iteration occurs for the pressure drop across the ICV for each lateral. For example, the iteration can occur between the calculated pressure drop using Equation (2) and the calculated pressure drop from Equation (3).

At 212, if the pressure drops determined at steps 206 and 208 match (for example, the difference between the pressures is within a threshold difference). If both pressure drops are matched, processing can move to step 214. Otherwise, processing can return to step 202.

At 214, a new flowrate is calculated for the lateral. For example, the new flowrate can be calculated by utilizing Equation (1).

At 216, the flowrate is iterated for the lateral. Iterations are needed in order to calculate the pressure drop across the interval control valve.

At 218, if the flowrates determined at steps 214 and 216 match (for example, the difference between the flowrates is within a threshold difference), then processing can move to step 220. Otherwise, processing can return to step 202.

At 220, steps 202 to 218 are repeated for all laterals. For example, the steps 202 to 218 can be repeated for the lateral 112b.

At 222, a total flowrate and a flow contribution by each lateral is determined. For example, the total flowrate of the SWC can be calculated.

Table 1 shows production and other values for an oil well optimized using the numerical model.

TABLE 1

ICV Settings and Production Values

| Parameters | UNIT | LATERAL MB | LATERAL 1 | LATERAL 2 |
| --- | --- | --- | --- | --- |
| Interval Control Valve Size | INCH | 3.5 | 3.5 | 5.5 |
| Interval Control Valve Setting | STEP | 10 | 3 | 1 |
| Flow Coefficient Cv | — | 167.5 | 6.25 | 12.4 |
| Specific Gravity | — | 0.865 | 0.865 | 0.865 |
| Productivity Index Per Lateral | BPD/PSIG | 22.88 | 40.82 | 123.46 |
| Reservoir Pressure | PSIG | 3,210 | 3,309 | 3,332 |
| Proposed Wellbore Pressure | PSIG | 3,022 | 3,022 | 3,022 |
| Assumed Gross Flow Rate Per Lateral | BPD | 4,290 | 3,307 | 7,248 |
| Interval Control Valve Upstream Pressure | PSIG | 3,022 | 3,228 | 3,273 |
| Differential Pressure Across Interval Control Valve | PSIG | 0 | 206 | 251 |
| Interval Control Valve Downstream Pressure | PSIG | 3,022 | 3,022 | 3,022 |
| Differential Pressure Across Interval Control Valve | PSIG | 0 | 206 | 251 |
| Calculated Gross Flow Rate Per Lateral | BPD | 4,290 | 3,307 | 7,248 |
| Calculated Well Gross Flow Rate | BPD | | 14,845 | |
| Lateral Contribution Percentage | % | 29% | 29% | 29% |

Figure 3:
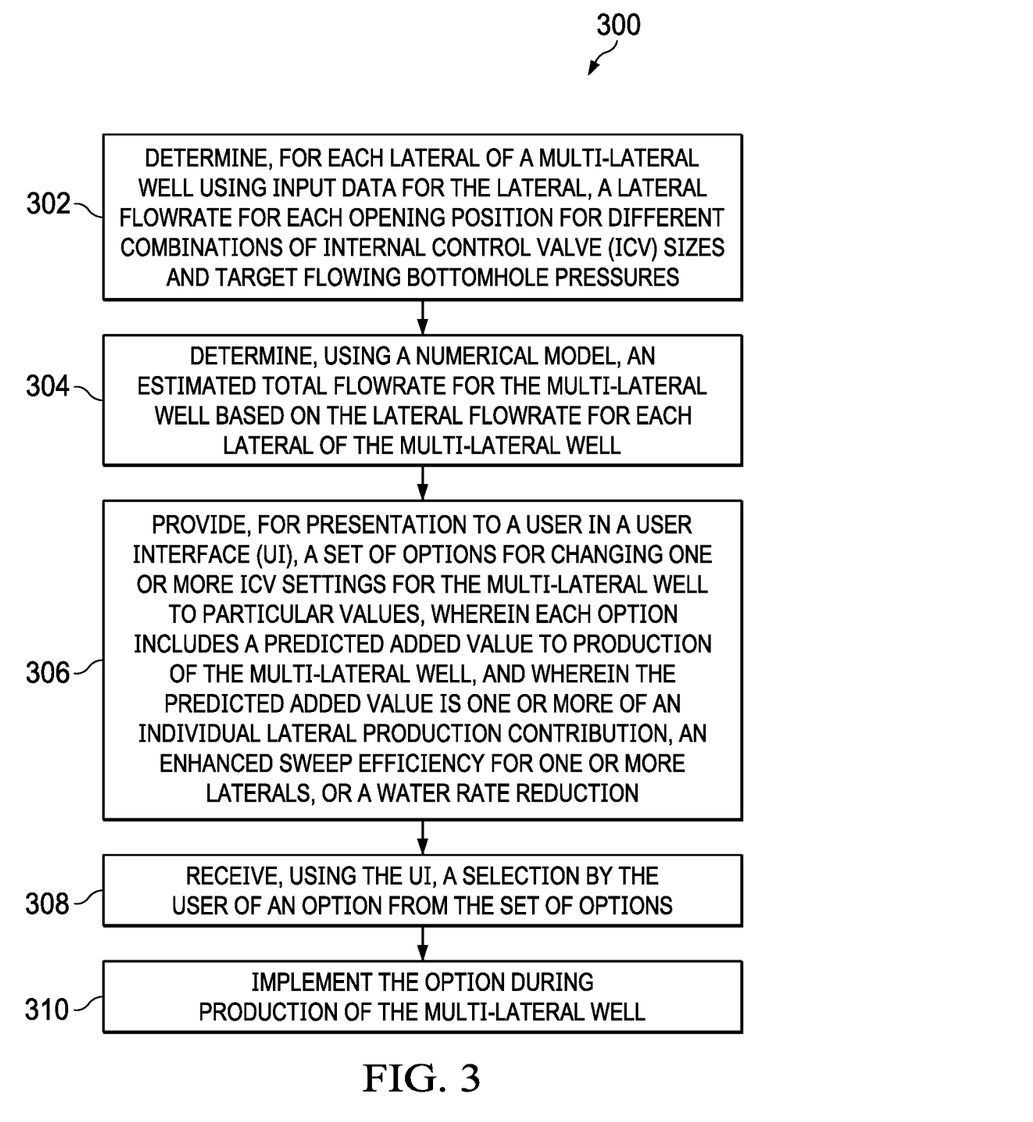
FIG. 3 is a flowchart of an example method for suggesting and implementing changes to interval control valve (ICV) settings for a multi-lateral well, according to some implementations of the present disclosure.

FIG. 3 is a flowchart of an example method 300 for suggesting and implementing changes to interval control valve (ICV) settings for a multi-lateral well, according to some implementations of the present disclosure. For clarity of presentation, the description that follows generally describes method 300 in the context of the other figures in this description. However, it will be understood that method 300 can be performed, for example, by any suitable system, environment, software, and hardware, or a combination of systems, environments, software, and hardware, as appropriate. In some implementations, various steps of method 300 can be run in parallel, in combination, in loops, or in any order.

At 302, for each lateral of a multi-lateral well and using input data for the lateral, a lateral flowrate is determined for each opening position for different combinations of ICV sizes and target flowing bottomhole pressures.

In some implementations, input data can include: a productivity index for each lateral; a reservoir pressure for each lateral; an interval control valve size, setting, and flow area; a calibrated field interval control valve flow coefficient ($C_v$) based on changes on water cut; pressure, volume, and temperature (PVT) data, a water cut for each lateral, and a proposed flowing bottomhole pressure for the multi-lateral well. From 302, method 300 proceeds to 304.

At 304, using a numerical model, an estimated total flowrate is determined for each lateral of the multi-lateral well based on the lateral flowrate for the lateral. From 304, method 300 proceeds to 306.

At 306, a set of options is provided for presentation to a user in a user interface (UI) for changing one or more ICV settings of the multi-lateral well to particular values. Each option includes a predicted added value to production of the multi-lateral well. The predicted added value includes one or more of an individual lateral production contribution, an enhanced sweep efficiency for one or more laterals, or a water rate reduction. From 306, method 300 proceeds to 308.

At 308, a selection by the user of an option selected from the set of options is received using the UI. Programming language such as Matlab can be utilized to write the analytical model code. From 308, method 300 proceeds to 310.

At 310, the option is implemented during production of the multi-lateral well. After 310, method 300 can stop. All parameters can be updated by running the written code through Matlab application.

Figure 4:
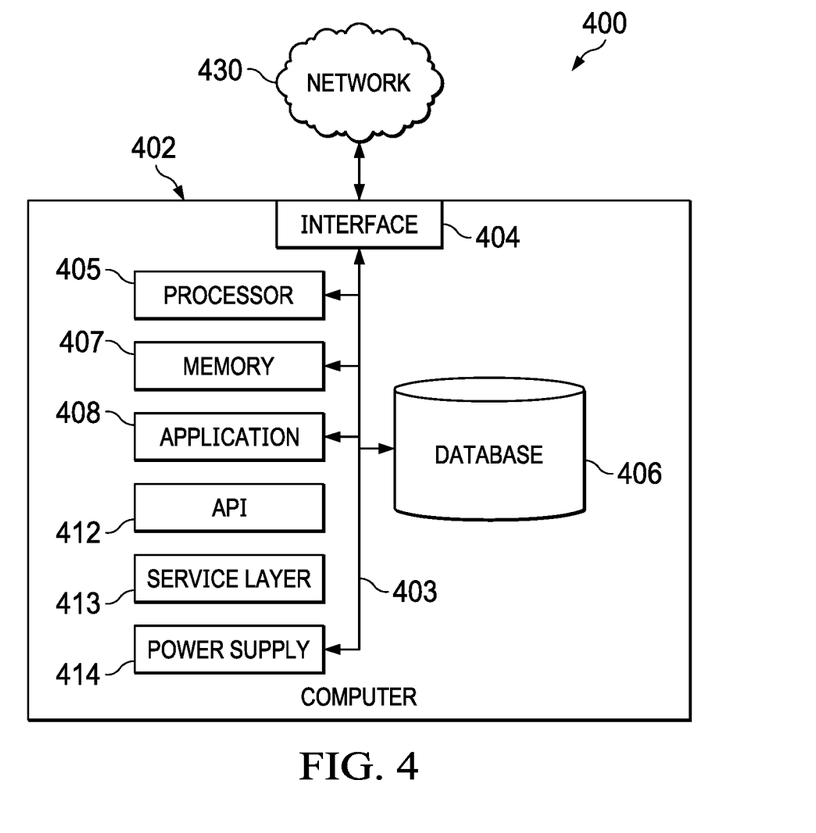
FIG. 4 is a block diagram illustrating an example computer system used to provide computational functionalities associated with described algorithms, methods, functions, processes, flows, and procedures as described in the present disclosure, according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430.

In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Described implementations of the subject matter can include one or more features, alone or in combination.

For example, in a first implementation, a computer-implemented method provides an iterative approach utilized to estimate the required interval control valves settings which will be implemented to deliver an optimum flowrate and flowing bottomhole pressure for each lateral. The computer-implemented method includes the following. For each lateral of a multi-lateral well and using input data for the lateral, a lateral flowrate is determined for each opening position for different combinations of internal control valve (ICV) sizes and target flowing bottomhole pressures. Using a numerical model, an estimated total flowrate is determined for each lateral of the multi-lateral well based on the lateral flowrate for the lateral. A set of options is provided for presentation to a user in a user interface (UI) for changing one or more ICV settings of the multi-lateral well to particular values. Each option includes a predicted added value to production of the multi-lateral well. The predicted added value includes one or more of an individual lateral production contribution, an enhanced sweep efficiency for one or more laterals, or a water rate reduction. A selection by the user of an option selected from the set of options is received using the UI. The option is implemented during production of the multi-lateral well.

The foregoing and other described implementations can each, optionally, include one or more of the following features:

A first feature, combinable with any of the following features, where the input data includes: a productivity index for each lateral; a reservoir pressure for each lateral; an interval control valve size, setting, and flow area; a calibrated field interval control valve flow coefficient ($C_v$) based on changes on water cut; pressure, volume, and temperature (PVT) data, a water cut for each lateral, and a proposed flowing bottomhole pressure for the multi-lateral well.

A second feature, combinable with any of the previous or following features, where determining, using the numerical model, the estimated total flowrate for the multi-lateral well includes: selecting an assumed lateral flowrate for the lateral; calculating a set of values for the lateral, including: calculating an interval control valve upstream pressure for the lateral, calculating a pressure drop across an interval control valve for the lateral, calculating an interval control valve downstream pressure for the lateral, and iterating the pressure drop across the interval control valve for the lateral; determining if a first difference between the pressure drop and the interval control valve downstream pressure is within a predetermined pressure difference threshold; in response to determining that the first difference is not within the predetermined pressure difference threshold, repeating the calculating of the set of values and determining the first difference; calculating a new flowrate for the lateral; determining if a second difference between the assumed lateral flowrate and the new flowrate is within a predetermined flowrate difference threshold; in response to determining that the second difference is not within the predetermined flowrate difference threshold, repeating the calculating of the set of values and determining the first difference; and using the new flowrate as the lateral flowrate of the lateral.

A third feature, combinable with any of the previous or following features, where calculating the pressure drop across the interval control valve for the lateral includes calculating the pressure drop based on a function of flowrate, an ICV $C_v$, and a fluid specific gravity.

A fourth feature, combinable with any of the previous or following features, where calculating the interval control valve upstream pressure for the lateral is based on a function of a reservoir pressure, a gross flowrate, and a productivity index.

A fifth feature, combinable with any of the previous or following features, where calculating the pressure drop across the interval control valve for the lateral is based on a liquid specific gravity, the gross flowrate, and an ICV $C_v$.

A sixth feature, combinable with any of the previous or following features, where calculating an interval control valve downstream pressure for the lateral is based on a difference between the interval control valve upstream pressure and the interval control valve pressure drop.

In a second implementation, a non-transitory, computer-readable medium storing one or more instructions executable by a computer system to perform operations including the following. For each lateral of a multi-lateral well and using input data for the lateral, a lateral flowrate is determined for each opening position for different combinations of internal control valve (ICV) sizes and target flowing bottomhole pressures. Using a numerical model, an estimated total flowrate is determined for each lateral of the multi-lateral well based on the lateral flowrate for the lateral. A set of options is provided for presentation to a user in a user interface (UI) for changing one or more ICV settings of the multi-lateral well to particular values. Each option includes a predicted added value to production of the multi-lateral well. The predicted added value includes one or more of an individual lateral production contribution, an enhanced sweep efficiency for one or more laterals, or a water rate reduction. A selection by the user of an option selected from the set of options is received using the UI. The option is implemented during production of the multi-lateral well.

The foregoing and other described implementations can each, optionally, include one or more of the following features:

A first feature, combinable with any of the following features, where the input data includes: a productivity index for each lateral; a reservoir pressure for each lateral; an interval control valve size, setting, and flow area; a calibrated field interval control valve flow coefficient ($C_v$) based on changes on water cut; pressure, volume, and temperature (PVT) data, a water cut for each lateral, and a proposed flowing bottomhole pressure for the multi-lateral well.

A second feature, combinable with any of the previous or following features, where determining, using the numerical model, the estimated total flowrate for the multi-lateral well includes: selecting an assumed lateral flowrate for the lateral; calculating a set of values for the lateral, including: calculating an interval control valve upstream pressure for the lateral, calculating a pressure drop across an interval control valve for the lateral, calculating an interval control valve downstream pressure for the lateral, and iterating the pressure drop across the interval control valve for the lateral; determining if a first difference between the pressure drop and the interval control valve downstream pressure is within a predetermined pressure difference threshold; in response to determining that the first difference is not within the predetermined pressure difference threshold, repeating the calculating of the set of values and determining the first difference; calculating a new flowrate for the lateral; determining if a second difference between the assumed lateral flowrate and the new flowrate is within a predetermined flowrate difference threshold; in response to determining that the second difference is not within the predetermined flowrate difference threshold, repeating the calculating of the set of values and determining the first difference; and using the new flowrate as the lateral flowrate of the lateral.

A third feature, combinable with any of the previous or following features, where calculating the pressure drop across the interval control valve for the lateral includes calculating the pressure drop based on a function of flowrate, an ICV $C_v$, and a fluid specific gravity.

A fourth feature, combinable with any of the previous or following features, where calculating the interval control valve upstream pressure for the lateral is based on a function of a reservoir pressure, a gross flowrate, and a productivity index.

A fifth feature, combinable with any of the previous or following features, where calculating the pressure drop across the interval control valve for the lateral is based on a liquid specific gravity, the gross flowrate, and an ICV $C_v$.

A sixth feature, combinable with any of the previous or following features, where calculating an interval control valve downstream pressure for the lateral is based on a difference between the interval control valve upstream pressure and the interval control valve pressure drop.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including the following. For each lateral of a multi-lateral well and using input data for the lateral, a lateral flowrate is determined for each opening position for different combinations of internal control valve (ICV) sizes and target flowing bottomhole pressures. Using a numerical model, an estimated total flowrate is determined for each lateral of the multi-lateral well based on the lateral flowrate for the lateral. A set of options is provided for presentation to a user in a user interface (UI) for changing one or more ICV settings of the multi-lateral well to particular values. Each option includes a predicted added value to production of the multi-lateral well. The predicted added value includes one or more of an individual lateral production contribution, an enhanced sweep efficiency for one or more laterals, or a water rate reduction. A selection by the user of an option selected from the set of options is received using the UI. The option is implemented during production of the multi-lateral well.

The foregoing and other described implementations can each, optionally, include one or more of the following features:

A first feature, combinable with any of the following features, where the input data includes: a productivity index for each lateral; a reservoir pressure for each lateral; an interval control valve size, setting, and flow area; a calibrated field interval control valve flow coefficient ($C_v$) based on changes on water cut; pressure, volume, and temperature (PVT) data, a water cut for each lateral, and a proposed flowing bottomhole pressure for the multi-lateral well.

A second feature, combinable with any of the previous or following features, where determining, using the numerical model, the estimated total flowrate for the multi-lateral well includes: selecting an assumed lateral flowrate for the lateral; calculating a set of values for the lateral, including: calculating an interval control valve upstream pressure for the lateral, calculating a pressure drop across an interval control valve for the lateral, calculating an interval control valve downstream pressure for the lateral, and iterating the pressure drop across the interval control valve for the lateral; determining if a first difference between the pressure drop and the interval control valve downstream pressure is within a predetermined pressure difference threshold; in response to determining that the first difference is not within the predetermined pressure difference threshold, repeating the calculating of the set of values and determining the first difference; calculating a new flowrate for the lateral; determining if a second difference between the assumed lateral flowrate and the new flowrate is within a predetermined flowrate difference threshold; in response to determining that the second difference is not within the predetermined flowrate difference threshold, repeating the calculating of the set of values and determining the first difference; and using the new flowrate as the lateral flowrate of the lateral.

A third feature, combinable with any of the previous or following features, where calculating the pressure drop across the interval control valve for the lateral includes calculating the pressure drop based on a function of flowrate, an ICV $C_v$, and a fluid specific gravity.

A fourth feature, combinable with any of the previous or following features, where calculating the interval control valve upstream pressure for the lateral is based on a function of a reservoir pressure, a gross flowrate, and a productivity index.

A fifth feature, combinable with any of the previous or following features, where calculating the pressure drop across the interval control valve for the lateral is based on a liquid specific gravity, the gross flowrate, and an ICV $C_v$.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses, for example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   determining, for each lateral of a multi-lateral well using input data for a lateral, a lateral flowrate for each opening position for different combinations of interval control valve (ICV) sizes and target flowing bottomhole pressures;
   determining, using a numerical model, an estimated total flowrate for the multi-lateral well based on the lateral flowrate for each lateral of the multi-lateral well;
   providing, for presentation to a user in a user interface (UI), a set of options for changing one or more ICV settings for the multi-lateral well to particular values, wherein each option includes a predicted added value to production of the multi-lateral well, and wherein the predicted added value is one or more of an individual lateral production contribution, an enhanced sweep efficiency for one or more laterals, or a water rate reduction;
   receiving, using the UI, a selection by the user of an option from the set of options; and
   implementing the option during production of the multi-lateral well.

2. The computer-implemented method of claim 1, wherein the input data includes: a productivity index for each lateral; a reservoir pressure for each lateral; an interval control valve size, setting, and flow area; a calibrated field interval control valve flow coefficient ($C_v$) based on changes on water cut; pressure, volume, and temperature (PVT) data, a water cut for each lateral, and a proposed flowing bottomhole pressure for the multi-lateral well.

3. The computer-implemented method of claim 1, wherein determining, using the numerical model, the estimated total flowrate for the multi-lateral well comprises:
   selecting an assumed lateral flowrate for each lateral;
   calculating a set of values for the lateral, including:
      calculating an interval control valve upstream pressure for the lateral;
      calculating a pressure drop across an interval control valve for the lateral;
      calculating an interval control valve downstream pressure for the lateral; and iterating the pressure drop across the interval control valve for the lateral;
determining if a first difference between the pressure drop and the interval control valve downstream pressure is within a predetermined pressure difference threshold;
in response to determining that the first difference is not within the predetermined pressure difference threshold, repeating the calculating of the set of values and determining the first difference;
calculating a new flowrate for the lateral;
determining if a second difference between the assumed lateral flowrate and the new flowrate is within a predetermined flowrate difference threshold;
in response to determining that the second difference is not within the predetermined flowrate difference threshold, repeating the calculating of the set of values and determining the first difference; and
using the new flowrate as the lateral flowrate of the lateral.

4. The computer-implemented method of claim 3, wherein calculating the pressure drop across the interval control valve for the lateral includes calculating the pressure drop based on a function of flowrate, an ICV $C_v$, and a fluid specific gravity.

5. The computer-implemented method of claim 3, wherein calculating the interval control valve upstream pressure for the lateral is based on a function of a reservoir pressure, a gross flowrate, and a productivity index.

6. The computer-implemented method of claim 4, wherein calculating the pressure drop across the interval control valve for the lateral is based on a liquid specific gravity, the gross flowrate, and an ICV $C_v$.

7. The computer-implemented method of claim 5, wherein calculating an interval control valve downstream pressure for the lateral is based on a difference between the interval control valve upstream pressure and the interval control valve pressure drop.

8. A non-transitory, computer-readable medium storing one or more instructions executable by a computer system to perform operations comprising:
determining, for each lateral of a multi-lateral well using input data for a lateral, a lateral flowrate for each opening position for different combinations of interval control valve (ICV) sizes and target flowing bottomhole pressures;
determining, using a numerical model, an estimated total flowrate for the multi-lateral well based on the lateral flowrate for each lateral of the multi-lateral well;
providing, for presentation to a user in a user interface (UI), a set of options for changing one or more ICV settings for the multi-lateral well to particular values, wherein each option includes a predicted added value to production of the multi-lateral well, and wherein the predicted added value is one or more of an individual lateral production contribution, an enhanced sweep efficiency for one or more laterals, or a water rate reduction;
receiving, using the UI, a selection by the user of an option from the set of options; and
implementing the option during production of the multi-lateral well.

9. The non-transitory, computer-readable medium of claim 8, wherein the input data includes: a productivity index for each lateral; a reservoir pressure for each lateral; an interval control valve size, setting, and flow area; a calibrated field interval control valve flow coefficient ($C_v$) based on changes on water cut; pressure, volume, and temperature (PVT) data, a water cut for each lateral, and a proposed flowing bottomhole pressure for the multi-lateral well.

10. The non-transitory, computer-readable medium of claim 8, wherein determining, using the numerical model, the estimated total flowrate for the multi-lateral well comprises:
selecting an assumed lateral flowrate for each lateral;
calculating a set of values for the lateral, including:
calculating an interval control valve upstream pressure for the lateral;
calculating a pressure drop across an interval control valve for the lateral;
calculating an interval control valve downstream pressure for the lateral; and
iterating the pressure drop across the interval control valve for the lateral;
determining if a first difference between the pressure drop and the interval control valve downstream pressure is within a predetermined pressure difference threshold;
in response to determining that the first difference is not within the predetermined pressure difference threshold, repeating the calculating of the set of values and determining the first difference;
calculating a new flowrate for the lateral;
determining if a second difference between the assumed lateral flowrate and the new flowrate is within a predetermined flowrate difference threshold;
in response to determining that the second difference is not within the predetermined flowrate difference threshold, repeating the calculating of the set of values and determining the first difference; and
using the new flowrate as the lateral flowrate of the lateral.

11. The non-transitory, computer-readable medium of claim 10, wherein calculating the pressure drop across the interval control valve for the lateral includes calculating the pressure drop based on a function of flowrate, an ICV $C_v$, and a fluid specific gravity.

12. The non-transitory, computer-readable medium of claim 10, wherein calculating the interval control valve upstream pressure for the lateral is based on a function of a reservoir pressure, a gross flowrate, and a productivity index.

13. The non-transitory, computer-readable medium of claim 11, wherein calculating the pressure drop across the interval control valve for the lateral is based on a liquid specific gravity, the gross flowrate, and an ICV $C_v$.

14. The non-transitory, computer-readable medium of claim 12, wherein calculating an interval control valve downstream pressure for the lateral is based on a difference between the interval control valve upstream pressure and the interval control valve pressure drop.

15. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
determining, for each lateral of a multi-lateral well using input data for a lateral, a lateral flowrate for each opening position for different combinations of interval control valve (ICV) sizes and target flowing bottomhole pressures;

determining, using a numerical model, an estimated total flowrate for the multi-lateral well based on the lateral flowrate for each lateral of the multi-lateral well;

providing, for presentation to a user in a user interface (UI), a set of options for changing one or more ICV settings for the multi-lateral well to particular values, wherein each option includes a predicted added value to production of the multi-lateral well, and wherein the predicted added value is one or more of an individual lateral production contribution, an enhanced sweep efficiency for one or more laterals, or a water rate reduction;

receiving, using the UI, a selection by the user of an option from the set of options; and implementing the option during production of the multi-lateral well.

16. The computer-implemented system of claim 15, wherein the input data includes: a productivity index for each lateral; a reservoir pressure for each lateral; an interval control valve size, setting, and flow area; a calibrated field interval control valve flow coefficient ($C_v$) based on changes on water cut; pressure, volume, and temperature (PVT) data, a water cut for each lateral, and a proposed flowing bottom-hole pressure for the multi-lateral well.

17. The computer-implemented system of claim 15, wherein determining, using the numerical model, the estimated total flowrate for the multi-lateral well comprises:

selecting an assumed lateral flowrate for each lateral;

calculating a set of values for the lateral, including:

calculating an interval control valve upstream pressure for the lateral;

calculating a pressure drop across an interval control valve for the lateral;

calculating an interval control valve downstream pressure for the lateral; and iterating the pressure drop across the interval control valve for the lateral;

determining if a first difference between the pressure drop and the interval control valve downstream pressure is within a predetermined pressure difference threshold;

in response to determining that the first difference is not within the predetermined pressure difference threshold, repeating the calculating of the set of values and determining the first difference;

calculating a new flowrate for the lateral;

determining if a second difference between the assumed lateral flowrate and the new flowrate is within a predetermined flowrate difference threshold;

in response to determining that the second difference is not within the predetermined flowrate difference threshold, repeating the calculating of the set of values and determining the first difference; and using the new flowrate as the lateral flowrate of the lateral.

18. The computer-implemented system of claim 17, wherein calculating the pressure drop across the interval control valve for the lateral includes calculating the pressure drop based on a function of flowrate, an ICV $C_v$, and a fluid specific gravity.

19. The computer-implemented system of claim 17, wherein calculating the interval control valve upstream pressure for the lateral is based on a function of a reservoir pressure, a gross flowrate, and a productivity index.

20. The computer-implemented system of claim 18, wherein calculating the pressure drop across the interval control valve for the lateral is based on a liquid specific gravity, the gross flowrate, and an ICV $C_v$.

* * * * *